US009166224B2

(12) United States Patent
Yu et al.

(10) Patent No.: US 9,166,224 B2
(45) Date of Patent: Oct. 20, 2015

(54) LITHIUM TITANATE, NEGATIVE ELECTRODE INCLUDING THE LITHIUM TITANATE, AND SECONDARY LITHIUM BATTERY CONTAINING THE ELECTRODE

(75) Inventors: Yong-Mi Yu, Yongin-si (KR); Jong-Hee Lee, Yongin-si (KR)

(73) Assignee: SAMSUNG SDI CO., LTD., Yongin-si, Gyeonggi-do (KR)

( * ) Notice: Subject to any disclaimer, the term of this patent is extended or adjusted under 35 U.S.C. 154(b) by 872 days.

(21) Appl. No.: 13/324,507

(22) Filed: Dec. 13, 2011

(65) Prior Publication Data

US 2012/0244439 A1 Sep. 27, 2012

(30) Foreign Application Priority Data

Mar. 25, 2011 (KR) ........................ 10-2011-0027015

(51) Int. Cl.
| | |
|---|---|
| *H01M 4/485* | (2010.01) |
| *H01M 4/131* | (2010.01) |
| *C01D 15/02* | (2006.01) |
| *C01G 23/00* | (2006.01) |
| *H01M 4/62* | (2006.01) |

(52) U.S. Cl.
CPC ............. *H01M 4/485* (2013.01); *C01D 15/02* (2013.01); *C01G 23/005* (2013.01); *H01M 4/131* (2013.01); *C01P 2002/80* (2013.01); *C01P 2006/40* (2013.01); *H01M 4/622* (2013.01); *H01M 4/623* (2013.01); *H01M 4/625* (2013.01); *Y02E 60/122* (2013.01); *Y10T 428/2982* (2015.01)

(58) Field of Classification Search
CPC ...... H01M 4/485; H01M 4/131; C01D 15/02; C01G 23/005; C01G 23/04; C01G 23/00
See application file for complete search history.

(56) References Cited

U.S. PATENT DOCUMENTS

| 6,436,577 B1 | 8/2002 | Kida et al. |
| 7,078,009 B2 * | 7/2006 | Ogawa et al. ............... 423/593.1 |
| 7,682,596 B2 * | 3/2010 | Bourbon et al. ............... 423/598 |
| 2002/0106560 A1 * | 8/2002 | Kolb et al. ..................... 429/212 |
| 2006/0257746 A1 * | 11/2006 | Inagaki et al. ............. 429/231.5 |
| 2008/0113264 A1 * | 5/2008 | Inagaki et al. ................ 429/156 |

(Continued)

FOREIGN PATENT DOCUMENTS

| JP | 2002-274849 | * | 9/2002 | ............. C01G 23/00 |
| JP | 2010-140863 A | | 6/2010 | |

(Continued)

OTHER PUBLICATIONS

Xing et al., "Stuctural and Electrochemical Characteristics of Li4—xKxTi5O12 as Anode Material for Lithium-Ion Batteries," Chinese Journal of Inorganic Chemistry, vol. 26, No. 2, 233-239, Published Feb. 26, 2010, abstract only.*

(Continued)

*Primary Examiner* — Ula C Ruddock
*Assistant Examiner* — Amanda Barrow
(74) *Attorney, Agent, or Firm* — Knobbe Martens Olson & Bear LLP (57) ABSTRACT

A negative electrode for a lithium secondary battery that includes, as a negative active material, a lithium titanate ($Li_4Ti_5O_{12}$) compound containing 0.004 parts by weight or less of phosphorous (P) and 0.007 parts by weight or less of potassium (K) based on 100 parts by weight of lithium titanate, a binder, and a conductive agent, and a lithium secondary battery including the negative electrode.

19 Claims, 3 Drawing Sheets

(56) References Cited

U.S. PATENT DOCUMENTS

| | | |
|---|---|---|
| 2009/0042095 A1* | 2/2009 | Inagaki et al. .................. 429/92 |
| 2009/0155692 A1 | 6/2009 | Park et al. |
| 2010/0015509 A1* | 1/2010 | Inagaki et al. .................. 429/93 |
| 2010/0151327 A1 | 6/2010 | Nakahara et al. |
| 2011/0059366 A1* | 3/2011 | Eom ........................ 429/231.95 |
| 2011/0189545 A1 | 8/2011 | Holzapfel et al. |
| 2012/0153225 A1* | 6/2012 | Ko et al. ................. 252/301.4 P |

FOREIGN PATENT DOCUMENTS

| | | |
|---|---|---|
| KR | 2000-0076049 A | 12/2000 |
| KR | 1020070058678 A | 6/2007 |
| KR | 2008-0020087 A | 3/2008 |
| KR | 2008-0023831 A | 3/2008 |
| KR | 10-2009-0066019 A | 6/2009 |
| KR | 10-2011-0014682 A | 2/2011 |

OTHER PUBLICATIONS

Korean Notice of Allowance dated Aug. 30, 2013 issued in connection with corresponding Korean Patent Application No. 10-2011-0027015, in 6 pages.

* cited by examiner

LITHIUM TITANATE, NEGATIVE ELECTRODE INCLUDING THE LITHIUM TITANATE, AND SECONDARY LITHIUM BATTERY CONTAINING THE ELECTRODE

CROSS-REFERENCE TO RELATED APPLICATIONS

This application claims the benefit of Korean Patent Application No. 10-2011-0027015, filed on Mar. 25, 2011, in the Korean Intellectual Property Office, the disclosure of which is incorporated herein in its entirety by reference.

BACKGROUND

1. Field

One or more embodiments relate to a lithium titanate, a negative electrode for a lithium secondary battery that includes the lithium titanate, and a lithium secondary battery including the negative electrode.

2. Description of the Related Technology

Lithium titanate ($Li_4Ti_5O_{12}$) is useful as an electrode material in a lithium secondary battery.

Usually, lithium titanate is prepared by dry-heat treating a mixture including titanium dioxide and a lithium compound, or by using other dry or wet powder synthesis methods that are known to one of ordinary skill in the art.

Conventionally, lithium titanate is obtained from titanium dioxide as a starting material. In preparing an electrode material having excellent characteristics, titanium dioxide, as a starting material of lithium titanate, plays an important role. Among a lithium precursor and a titanium precursor, which are necessary starting materials of lithium titanate, an amount of the titanium precursor needed in consideration of a composition ratio with respect to the lithium precursor is relatively high and thus, the kind and amount of elements contained in the titanium precursor affects battery performance more than those in the lithium precursor. Also, in consideration of a percentage of the titanium precursor in the total raw material costs, it is important to select an appropriate titanium precursor. When high-purity titanium dioxide is used as a precursor of lithium titanate, many problems including high manufacturing costs may occur.

Lithium titanate undergoes a small volumetric change during charging and discharging and thus has excellent rapid charge and discharge characteristics, and when used in a lithium battery, the lithium battery has high-performance characteristics. Accordingly, it is expected that lithium titanate is very useful as an electrode material of a high-output battery used in an application, such as a hybrid electric vehicle, that requires rapid charging and discharging.

An important characteristic of a high-capacity middle and large-sized battery is rate capacity. However, lithium titanate has lower charge and discharge capacity than a conventional graphite-based negative active material. Thus, there is a need to embody a capacity near a theoretical value and improve capacity retention characteristics by control of impurities in the active material.

SUMMARY

One or more embodiments include lithium titanate, a method of preparing lithium titanate, a negative electrode including the lithium titanate, and a lithium secondary battery including the negative electrode.

Additional aspects will be set forth in part in the description which follows and, in part, will be apparent from the description, or may be learned by practice of the presented embodiments.

According to one or more embodiments, disclosed is a lithium titanate ($Li_4Ti_5O_{12}$) including 0.004 parts by weight or less of phosphorous (P) and 0.007 parts by weight or less of potassium (K) based on 100 parts by weight of lithium titanate.

According to one or more embodiments, a negative electrode for a lithium secondary battery includes a negative active material including the lithium titanate as described above, a binder, and a conductive agent.

According to one or more embodiments, a method of manufacturing a negative electrode for a lithium secondary battery includes: mixing titanium dioxide ($TiO_2$) including phosphorous (P) and potassium (K) with a lithium precursor to provide a first composition; sintering the first composition to prepare lithium titanate; providing a negative active material composition including lithium titanate; and coating the negative active material composition on a substrate.

BRIEF DESCRIPTION OF THE DRAWINGS

These and/or other aspects will become apparent and more readily appreciated from the following description of the embodiments, taken in conjunction with the accompanying drawings of which.

DETAILED DESCRIPTION

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description.

A lithium titanate compound according to an embodiment contains 0.004 parts by weight or less of phosphorous (P) and 0.007 parts by weight or less of potassium (K) based on 100 parts by weight of lithium titanate ($Li_4Ti_5O_{12}$). For example, an amount of phosphorous (P) is about 0.0001 to about 0.004 parts by weight and an amount of potassium (K) is about 0.0001 parts by weight to about 0.007 parts by weight, based on 100 parts by weight of lithium titanate ($Li_4Ti_5O_{12}$). If the lithium titanate contains such amount ranges of phosphorous (P) and potassium (K), a lithium secondary battery including the lithium titanate has excellent capacity characteristics.

The phosphorous contained in the lithium titanate may be oxidized during the manufacturing process and may be present in an oxide form, for example, in a form of at least one selected from phosphorus pentoxide ($P_2O_5$) and phosphorus trioxide ($P_2O_3$).

The potassium contained in the lithium titanate may be included, for example, in a form of potassium oxide ($K_2O$).

An average diameter of lithium titanate may be about 700 nm to about 1 μm. If the average diameter of lithium titanate is within the range as described above, a negative electrode for a lithium secondary battery may be easily manufactured. However, the average diameter of lithium titanate is not limited thereto.

A negative electrode for a lithium secondary battery according to an embodiment includes a negative active material including lithium titanate, a binder, and a conductive agent, wherein the lithium titanate includes 0.004 parts by weight or less of phosphorous (P) and 0.007 parts by weight or less of potassium (K) based on 100 parts by weight of lithium titanate ($Li_4Ti_5O_{12}$), for example, about 0.0001 to about 0.004 parts by weight of phosphorous (P) and about 0.0001 parts by weight to about 0.007 parts by weight of potassium (K).

The conductive agent provides conductivity to the negative electrode and may be any one of various materials that do not cause any chemical change in a battery to be formed and that conduct electrons. Examples of the conductive agent include a carbonaceous material, such as natural graphite, artificial graphite, flaky graphite, carbon black, acetylene black, ketjen black, denka black, carbon fiber; a metallic material, such as copper powder or fiber, nickel powder or fiber, aluminum powder or fiber, or silver powder or fiber; a conductive polymer such as a polyphenylene derivative, and a mixture thereof.

The binder may allow negative active material particles to be attached to each other and the negative active material to be attached to a current collector. Nonlimiting examples of the binder are polyvinylalcohol, carboxymethylcellulose, hydroxypropylcellulose, diacetylcellulose, polyvinylchloride, carboxylated polyvinylchloride, polyvinylfluoride, an ethylene oxide-containing polymer, polyvinylpyrrolidone, polyurethane, polytetrafluoroethylene, polyvinylidene fluoride, polyethylene, polypropylene, styrene-butadiene rubber, acrylated styrene-butadiene rubber, polyimide, epoxy resin, nylon, and a mixture thereof. For example, the binder may be polyvinylidene fluoride (PVDF). An amount of the binder may be at the same level as commonly used in forming an active material layer.

In a method of preparing a negative electrode including lithium titanate according to an embodiment, a titanium precursor may be selected from the group consisting of titanium dioxide ($TiO_2$), $TiCl_3$, $TiCl_4$, $Ti(NO_3)_4$, $TiOH_4$, and titanium alkoxide. Hereinafter, the following embodiment will be described using titanium dioxide ($TiO_2$) as a titanium precursor, but the present embodiments are not limited thereto.

A method of preparing a negative electrode including lithium titanate according to an embodiment includes: mixing titanium dioxide ($TiO_2$) including phosphorous (P) and potassium (K) with a lithium precursor to provide a first composition; sintering the first composition to prepare lithium titanate; providing a negative active material composition including lithium titanate; and coating the negative active material composition on a substrate.

In preparing the lithium titanate, titanium dioxide in which an amount of phosphorous (P) may be 0.008 parts by weight or less, for example, from about 0.0002 to about 0.008 parts by weight, for example, from about 0.0005 to about 0.0045 parts by weight, based on 100 parts by weight of titanium dioxide ($TiO_2$); and an amount of potassium (K) may be 0.008 parts by weight or less, for example, from about 0.0002 to about 0.008 parts by weight, for example, from about 0.0005 to about 0.0075 parts by weight, based on 100 parts by weight of titanium dioxide ($TiO_2$), may be used as a starting material. However, titanium dioxide available for embodiments is not limited to the titanium dioxide having such amounts of phosphorous and potassium, and amounts of phosphorous and potassium contained in lithium titanate may vary according to manufacturing conditions.

When lithium titanate including such amounts of phosphorous and potassium is used, a lithium secondary battery including the lithium titanate as a negative active material may has excellent capacity characteristics and a high capacity retention rate.

The negative active material composition may further include a binder, a conductive agent, and a solvent.

The lithium precursor used to prepare the first composition may include at least one selected from the group consisting of $LiCO_3$, LiCl, LiOH, $LiNO_3$, LiF, $LiSO_4$, and $LiNO_3$.

The titanium dioxide ($TiO_2$) may be titanate having whiteness of 96% or more, for example, from about 97 to about 99%. A lithium titanate manufactured using titanium dioxide having such whiteness may have excellent capacity characteristics.

The term 'whiteness' refers to a degree of whiteness and a combination of a reflection rate in a whole wavelength range of the light spectrum and a total reflection rate of white light. The titanium dioxide having such amount ranges of phosphorous (P) and potassium (K) may have a whiteness of 96% or more, for example, about 97 to 99%. Whiteness may be enhanced to 96% or more by using a whitening agent for substantially increasing a reflection rate of powder. However, in a battery, a whitening agent acts as an impurity which lowers battery performance. Accordingly, the 'whiteness' used herein refers to whiteness to which a whitening agent is not added.

In preparing the lithium titanate, the first composition may be sintered at a temperature of about 700 to about 1000° C., for example, about 800 to about 900° C. The lithium titanate prepared by sintering may be pulverized and then, the obtained lithium titanate particles may be classified to select lithium titanate particles having a size suitable for manufacturing a negative electrode for a lithium secondary battery. For example, an average size of classified lithium titanate particles may be from about 700 nm to about 1 μm, but is not limited thereto.

In the providing of the negative active material composition including the lithium titanate, the negative active material including the lithium titanate, the conductive agent, and the binder may be mixed at a mix ratio that is commonly used in preparing a negative active material composition, and the mix ratio may vary according to kinds of a negative active material, a conductive agent, and a binder. For example, the mix ratio may be 90:5:5, and the mixture is mixed with a solvent to prepare a negative active material composition. However, the mix ratio is not limited thereto.

In the providing of the negative active material composition including the lithium titanate, the solvent may be any one of various solvents that are commonly used in a composition for forming an active material layer. Examples of the solvent are a chain carbonate, such as dimethyl carbonate, ethylmethyl carbonate. diethyl carbonate, or dipropyl carbonate, a cyclic carbonate, such as dimethoxyethane, diethoxyethane, a fatty acid ester derivative, ethylene carbonate, propylene carbonate, or butylene carbonate, γ-butyrolactone, N-methylpyrrolidone (NMP), acetone, or water. The solvent may also be a combination of two or more of these.

The binder and the conductive agent which are used in preparing the negative active material composition may be identical to those described with respect to the negative electrode for a lithium secondary battery.

The substrate that is to be coated with the negative active material composition in manufacturing the negative electrode may be any one of various current collectors that are commonly used in a negative electrode. The substrate may be, for example, a copper foil, or an aluminum foil, but is not limited thereto.

A lithium secondary battery according to an embodiment includes a negative electrode, a positive electrode, and an electrolyte.

An example of the lithium secondary battery is a lithium secondary battery including a negative electrode including lithium titanate containing 0.004 parts by weight or less of phosphorous (P) and 0.007 parts by weight or less of potassium (K) based on 100 parts by weight of lithium titanate ($Li_4Ti_5O_{12}$), a positive electrode, and an electrolyte. An amount of phosphorous (P) contained in the lithium titanate included in the negative electrode of the lithium secondary battery may be from about 0.001 to about 0.004 parts by weight and an amount of potassium (K) contained in the lithium titanate included in the negative electrode of the lithium secondary battery may be from about 0.001 to about 0.007 parts by weight or less.

An example of a method of manufacturing the lithium secondary battery will now be described in detail. First, the negative electrode as described above is prepared.

Then, the positive electrode as a reference electrode of the negative electrode is prepared as follows. The following manufacturing process for the positive electrode is just an example.

A positive electrode active material, a conductive agent, a binder, and a solvent are mixed to prepare a positive electrode active material composition. The positive electrode active material composition may be directly coated or dried on a current collector to prepare a positive electrode plate. Alternatively, the positive electrode active material composition is cast on a separate support and a film separated from the support is laminated on a current collector to prepare a positive electrode plate. The current collector may be an Al current collector that is commonly used as a positive electrode current collector, but is not limited thereto.

The conductive agent, the binder, and the solvent which are used in the positive electrode active material composition may be any one of those that are commonly used in preparing an electrode composition, and examples thereof are the same as presented with respect to the negative electrode above.

The positive active material may include a compound that reversibly intercalates or deintercalates lithium, that is, a lithiated intercalation compound. For example, the positive active material may include at least one composite oxide including lithium and metal selected from cobalt, manganese, nickel, and a combination thereof The compound may be a compound represented by any one of the following formulae:

$Li_aA_{1-b}X_bD_2$ (where $0.95 \le a \le 1.1$, and $0 \le b \le 0.5$); $Li_aE_{1-b}X_bO_{2-c}D_c$ (where $0.95 \le a \le 1.1$, $0 \le b \le 0.5$, and $0 \le c \le 0.05$); $LiE_{2-b}X_bO_{4-c}D_c$ (where $0 \le b \le 0.5$, and $0 \le c \le 0.05$); $Li_aNi_{1-b-c}Co_bB_cD_\alpha$ (where $0.95 \le a \le 1.1$, $0 \le b \le 0.5$, $0 \le c \le 0.05$, and $0 < \alpha \le 2$); $Li_aNi_{1-b-c}Co_bX_cO_{2-\alpha}M_\alpha$ (where $0.95 \le a \le 1.1$, $0 \le b \le 0.5$, $0 \le c \le 0.05$, and $0 < \alpha < 2$); $Li_aNi_{1-b-c}CO_bX_cO_{2-\alpha}M_2$ (where $0.95 \le a \le 1.1$, $0 \le b \le 0.5$, $0 \le c \le 0.05$, and $0 < \alpha < 2$); $Li_aNi_{1-b-c}Mn_bX_cD_\alpha$ (where $0.95 \le a \le 1.1$, $0 \le b \le 0.5$, $0 \le c \le 0.05$, $0 < \alpha < 2$); $Li_aNi_{1-b-c}Mn_bX_cO_{2-\alpha}M_\alpha$ (where $0.95 \le a \le 1.1$, $0 \le b \le 0.5$, $0 \le c \le 0.05$, and $0 \le \alpha \le 2$); $Li_aNi_{1-b-c}Mn_bX_cO_{2-\alpha}M_2$ (where $0.95 \le a \le 1.1$, $0 \le b \le 0.5$, $0 \le c \le 0.05$, and $0 < \alpha < 2$); $Li_aNi_bE_cG_dO_2$ (where $0.90 \le a \le 1.1$, $0 \le b \le 0.9$, $0 \le c \le 0.5$, and $0.001 \le d \le 0.1$); $Li_aNi_bCo_cMn_dG_eO_2$ (where $0.90 \le a \le 1.1$, $0 \le b \le 0.9$, $0 \le c \le 0.5$, $0 \le d \le 0.5$, and $0.001 \le e \le 0.1$); $Li_aNiG_bO_2$ (where $0.90 \le a \le 1.1$, and $0.001 \le b \le 0.1$); $Li_aCoG_bO_2$ (where $0.90 \le a \le 1.1$, and $0.001 \le b \le 0.1$); $Li_aMnG_bO_2$ (where $0.90 \le a \le 1.1$, and $0.001 \le b \le 0.1$); $Li_aMn_2G_bO_4$ (where $0.90 \le a \le 1.1$, and $0.001 \le b \le 0.1$); $QO_2$; $QS_2$; $LiQS_2$; $V_2O_5$; $LiV_2O_5$; $LiZO_2$; $LiNiVO_4$; $Li_{(3-f)}J_2(PO_4)_3$ (where $0 \le f \le 2$); and $Li_{(3-f)}Fe_2(PO_4)_3$ (where $0 \le f \le 2$); $LiFePO_4$; and $Li(NiCoMn)O_2$.

In the formulae as described above, A is selected from the group consisting of Ni, Co, Mn, and a combination thereof; X is selected from the group consisting of Al, Ni, Co, Mn, Cr, Fe, Mg, Sr, V, a rare-earth element and a combination thereof; D is selected from the group consisting of O, F, S, P, and a combination thereof; E is selected from the group consisting of Co, Mn, and a combination thereof; M is selected from the group consisting of F, S, P, and a combination thereof; G is selected from the group consisting of Al, Cr, Mn, Fe, Mg, La, Ce, Sr, V, and a combination thereof; Q is selected from the group consisting of Ti, Mo, Mn, and a combination thereof; Z is selected from the group consisting of Cr, V, Fe, Sc, Y, and a combination thereof; and J is selected from the group consisting of V, Cr, Mn, Co, Ni, Cu, and a combination thereof. However, A, X, D, E, M, G, Q, Z, and J are not limited thereto.

A coating layer may be further formed on a surface of the above compounds, or the compounds may be mixed with a compound including a coating layer for use. The coating layer may include at least one coating element compound selected from the group consisting of an oxide of a coating element, a hydroxide of a coating element, an oxyhydroxide of a coating element, an oxycarbonate of a coating element, and a hydroxycarbonate of a coating element. The coating layer compounds may be amorphous or crystalline. A coating element contained in the coating layer may be Mg, Al, Co, K, Na, Ca, Si, Ti, V, Sn, Ge, Ga, B, As, Zr, or a mixture thereof The coating layer formation method may be any coating method as long as when used, an element does not adversely affect properties of the cathode active material. For example, the coating method may be any one of various coating methods including spray coating and precipitation. The coating methods are obvious to one of ordinary skill in the art and thus, will not be described in detail herein.

The electrolyte may include a non-aqueous organic solvent and a lithium salt.

The non-aqueous organic solvent may function as a medium in which ions engaged in an electrochemical reaction of a battery migrate. In addition, if necessary, the non-aqueous organic solvent may further include various additives, such as an over charge inhibitor.

The non-aqueous organic solvent may function as a medium in which ions engaged in an electrochemical reaction of a battery migrate.

Examples of the non-aqueous organic solvent are a carbonate-based solvent, an ester-based solvent, an ether-based solvent, a ketone-based solvent, an alcohol-based solvent, or an aprotic solvent. Examples of a carbonate-based solvent are dimethyl carbonate (DMC), diethyl carbonate (DEC), dipropyl carbonate (DPC), methylpropyl carbonate (MPC), ethylpropyl carbonate (EPC), methylethylcarbonate (MEC), ethylene carbonate (EC), propylene carbonate (PC), butylenecarbonate (BC), and ethylmethyl carbonate (EMC). Examples of an ester-based solvent are methyl acetate, ethyl acetate, n-propyl acetate, dimethylacetate, methylpropionate, ethylpropionate, γ-butybutyrolactone, decanolide, valerolactone, mevalonolactone, and caprolactone. Examples of an ether-based solvent are dibutyl ether, tetraglyme, diglyme, dimethoxyethane, 2-methylhetrahydrofurane, and hetrahydrofurane. An example of a ketone-based solvent is cyclohexanone. Examples of an alcohol-based solvent are ethyl alcohol and isopropyl alcohol. Examples of an aprotic solvent are nitriles, such as R—CN (where R is a linear, branched, or cyclic C2 to C20 hydrocarbon group, and may include a double bond-direction cyclic or ether bonding), amides, such as dimethylformamide, dioxolans such as 1,3-dioxolane, and sulfolanes.

The non-aqueous organic solvents may be used alone or in combination of at least one of those described above. When the non-aqueous organic solvents are used in combination, a mix ratio may be appropriately adjusted according to a target battery performance, and may be obvious to one of ordinary skill in the art.

The lithium salt may be dissolved in an organic solvent and provides lithium ions in a lithium battery, thereby enabling basic operations of the lithium battery, and may be a material that promotes migration of lithium ions between a positive electrode and a negative electrode. The lithium salt may include as a supporting electrolyte salt at least one selected from the group consisting of $LiPF_6$, $LiBF_4$, $LiSbF_6$, $LiAsF_6$, $LiN(SO_2C_2F_5)_2$, $Li(CF_3SO_2)_2N$, $LiC_4F_9SO_3$, $LiClO_4$, $LiAlO_2$, $LiAlCl_4$, $LiN(C_xF_{2x+1}SO_2)(C_yF_{2y+1}SO_2)$ (where x and y are natural numbers), LiCl, LiI, and $LiB(C_2O_4)_2$ (lithium bis(oxalato) borate; LiBOB). A concentration of the lithium salt may be from about 0.1 to about 2.0M. If the concentration of the lithium salt is within the range described above, the electrolyte may have an appropriate conductivity and viscosity and thus have excellent electrolyte performance, and may allow lithium ions to effectively migrate.

According to a type of a lithium secondary battery, a separator may be formed between a positive electrode and a negative electrode. Examples of a separator are a mono- or multi-layer separator including polyethylene, polypropylene, or polyvinylidene fluoride, a two-layer mixed separator including polyethylene/polypropylene, a three-layer mixed separator including polyethylene/polypropylene/polyethylene, a three-layer mixed separator including polypropylene/polyethylene/polypropylene.

The lithium secondary battery may be, according to a separator and an electrolyte used, a lithium ion battery, a lithium ion polymer battery, or a lithium polymer battery; according to a shape, a cylindrical battery, a rectangular battery, a coin-type battery, or a pouch-type battery; and according to a size, a bulky battery and a thin-film type battery. Methods of manufacturing the lithium secondary batteries as described above are widely known in the art and thus, a description thereof will not be presented herein.

Figure 3:
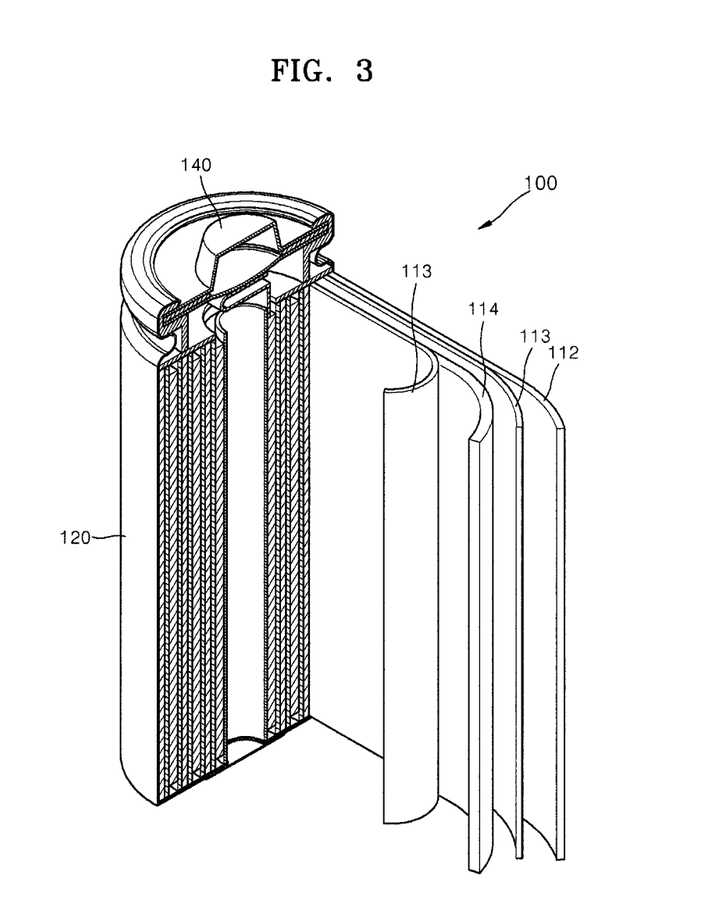
FIG. 3 is a schematic view of a lithium secondary battery according to an example embodiment.

FIG. 3 is a schematic view of a lithium secondary battery 100 according to an example embodiment. Referring to FIG. 3, the lithium secondary battery 100 includes a positive electrode 114, a negative electrode 112, a separator 113 interposed between the positive electrode 114 and the negative electrode 112, an electrolyte (not shown) with which the positive electrode 114, the negative electrode 112, and the separator 113 are impregnated, a battery case 120, and a sealing member 140 for sealing the battery case 120. The lithium secondary battery 100 of FIG. 3 is manufactured by sequentially depositing the positive electrode 114, the negative electrode 112, and the separator 113, winding the deposition structure, and placing the wound structure in the battery case 120.

The present embodiments will be described in further detail with reference to the following examples. These examples are for illustrative purposes only and are not intended to limit the scope of the present embodiments.

PREPARATION EXAMPLE 1

Preparation of Lithium Titanate 128.8 parts by weight of lithium carbonate, and 348.0 parts by weight of titanium dioxide containing 0.008 parts by weight of phosphorus and 0.008 parts by weight of potassium based on 100 parts by weight of the titanium dioxide were added as starting materials to a dry powder mixer, and then uniformly mixed. The obtained mixed powder was sintered in an oxygen atmosphere at a temperature of 850° C. for 5 hours while the temperature was increased by 5° C. per minute, and the sintering product was pulverized by using a pulverizer and subjected to a particle classification process, thereby producing lithium titanate power that contained 0.00349 parts by weight of phosphorous and 0.00663 of potassium based on 100 parts by weight of lithium titanate, and had an average particle diameter of about 800 nm to about 1 μm.

PREPARATION EXAMPLE 2

Preparation of Lithium Titanate

Lithium titanate powder that contained 0.00312 parts by weight of phosphorous and 0.00477 of potassium based on 100 parts by weight of the lithium titanate and had an average particle size of about 800 nm to about 1 μm was prepared in the same manner as in Preparation Example 1, except that titanium dioxide containing 0.00376 parts by weight of phosphorous and 0.00554 parts by weight of potassium based on 100 parts by weight of the titanium dioxide was used.

ICP data with respect to amounts of elements contained in titanium dioxide and lithium titanate used in Preparation Example 2 are shown in Table 1 below.

TABLE 1

| | ICP analysis data | |
|---|---|---|
| parts by weight | Lithium titanate Average | Titanium dioxide Average |
| Na | 0.02564 | ND |
| K | 0.00477 | 0.00554 |
| P | 0.00312 | 0.00376 |
| Fe | 0.06424 | 0.08135 |
| Al | ND | ND |
| Zr | 0.07678 | 0.08724 |
| Ca | ND | ND |
| Mg | ND | ND |
| S | 0.02921 | 0.03935 |
| Zn | ND | ND |
| Co | ND | ND |
| Ni | ND | ND |
| Cu | ND | ND |
| Cr | ND | ND |

COMPARATIVE PREPARATION EXAMPLE 1

Preparation of Lithium Titanate

Lithium titanate powder was prepared in the same manner as in Preparation Example 1, except that 348.0 parts by weight of titanium dioxide containing 0.010 parts by weight of phosphorous and 0.010 parts by weight of potassium based on 100 parts by weight of the titanium dioxide was used. The lithium titanate powder contained 0.00437 parts by weight of phosphorous and 0.00832 parts by weight of potassium based on 100 parts by weight of the lithium titanate.

COMPARATIVE PREPARATION EXAMPLE 2

Preparation of Lithium Titanate

Lithium titanate powder was prepared in the same manner as in Preparation Example 1, except that 348.0 parts by weight of titanium dioxide containing 0.015 parts by weight of phosphorous and 0.015 parts by weight of potassium based on 100 parts by weight of the titanium dioxide was used. The lithium titanate powder contained 0.00525 parts by weight of phosphorous and 0.01001 parts by weight of potassium based on 100 parts by weight of the lithium titanate.

EXAMPLE 1

Preparation of Negative Electrode

Lithium titanate ($Li_4Ti_5O_{12}$) prepared according to Preparation Example 1 as a negative active material, PVDF as a binder, and denka black as a conducting agent were mixed at a ratio of 90:5:5, and an NMP solvent was added thereto to prepare a slurry. The slurry was coated on an aluminum foil to prepare a negative electrode plate, and the coated negative electrode plate was pressed, and dried at a temperature of 130° C. in a vacuum drier, thereby completing manufacture of a negative electrode.

EXAMPLE 2

Preparation of Negative Electrode

A negative electrode was manufactured in the same manner as in Example 1, except that lithium titanate ($Li_4Ti_5O_{12}$) prepared according to Preparation Example 2 was used as a negative active material.

COMPARATIVE EXAMPLE 1

Preparation of Negative Electrode

A negative electrode was manufactured in the same manner as in Example 1, except that the lithium titanate prepared according to Comparative Preparation Example 1 was used as a negative active material.

COMPARATIVE EXAMPLE 2

Preparation of Negative Electrode

A negative electrode was manufactured in the same manner as in Example 1, except that the lithium titanate prepared according to Comparative Preparation Example 2 was used as a negative active material.

EVALUATION EXAMPLE

Manufacture of Coin Cells

Figure 1:
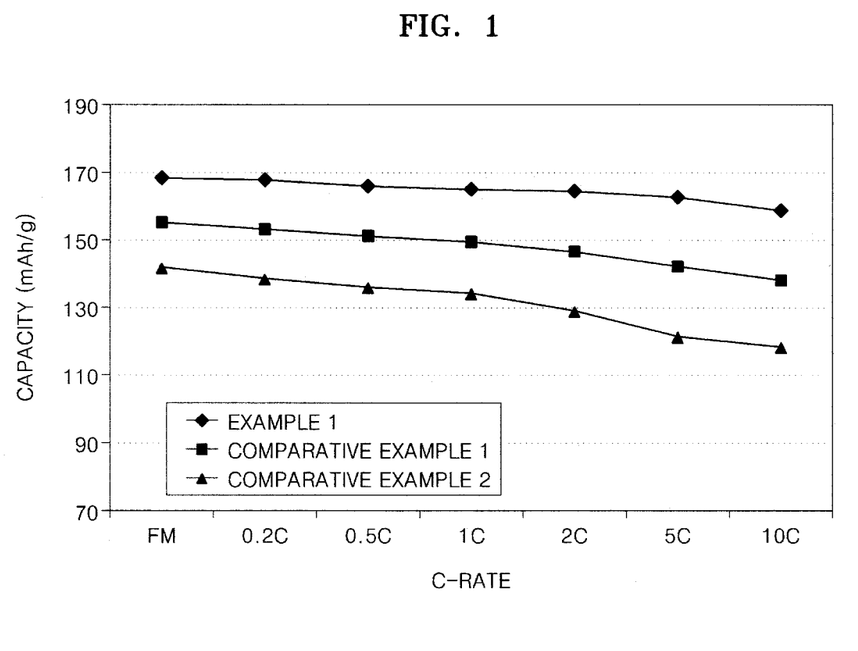
FIG. 1 is a graph of a discharge capacity with respect to a C-rate of batteries manufactured according to Example 1 and Comparative Examples 1 and 2.

Coin cells were manufactured using the negative electrodes manufactured according to Example 1 and Comparative Examples 1 and 2, a reference electrode comprising Li metal, a separation membrane comprising polypropylene, and an electrolyte composed of a mixed solvent containing EC and EMC at a mix ratio of 3:7 to which 1M $LiPF_6$ was added. Charge and discharge characteristics of the coin cells were evaluated in a range of about 1.0 to about 3.0 V, and at a C-rate that was set based on a theoretical capacity of lithium titanate. FIG. 1 shows discharge capacity results with respect to a C-rate and FIG. 2 shows a capacity retention rate with respect to a C-rate.

Regarding charge and discharge measurement, the coin cells were charged with 0.9 V constant current (CC)/constant voltage (CV) 0.01 C cut-off at a charge and discharge rate of 0.2 C, and then, 3.0 V cut-off discharged at a charge and discharge rate of 0.2 C. This charging and discharging is referred to as a one cycle. After one cycle, capacity and charge and discharge efficiency of the coin cells were evaluated. Then, discharge capacity and capacity retention rate of the coin cells were evaluated at charge and discharge rates of 0.5 C, 1 C, 2 C, 5 C, 10 C, and 20 C, and the results are shown in FIGS. 1 and 2.

Referring to FIG. 1, it was confirmed that the negative electrode manufactured according to Example 1 had higher initial capacitance and better high-rate capacity characteristics than the negative electrodes manufactured according to Comparative Examples 1 and 2.

Figure 2:
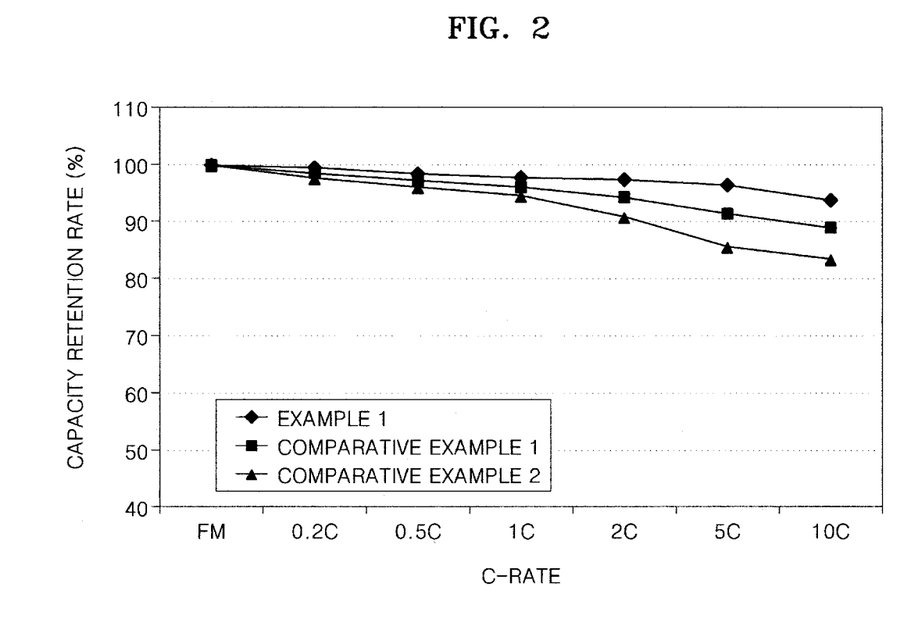
FIG. 2 is a graph of a capacity retention rate with respect to a C-rate of batteries manufactured according to Example 1 and Comparative Examples 1 and 2.

Referring to FIG. 2, it was confirmed that a battery including the negative electrode manufactured according to Example 1 had a higher high-rate capacity retention rate than batteries including the negative electrodes manufactured according to Comparative Examples 1 and 2.

Also, like the battery including the negative electrode of Example 1, a battery including the negative electrode manufactured according to Example 2 had excellent high-rate capacitance characteristics and a high capacity retention rate.

As confirmed in the evaluation example above, it was possible to improve battery performance by controlling amounts of phosphorous (P) and potassium (K) when an electrode was manufactured by using lithium titanate as an electrode active material.

It should be understood that the example embodiments described herein should be considered in a descriptive sense only and not for purposes of limitation. Descriptions of features or aspects within each embodiment should typically be considered as available for other similar features or aspects in other embodiments.

What is claimed is:

1. A lithium titanate ($Li_4Ti_5O_{12}$) compound comprising 0.001 to about 0.004 parts by weight of phosphorous (P) and 0.001 to about 0.007 parts by weight of potassium (K) based on 100 parts by weight of lithium titanate.

2. The lithium titanate of claim 1, wherein the phosphorous is comprised in a form of phosphorus pentoxide ($P_2O_5$) or phosphorus trioxide ($P_2O_3$).

3. The lithium titanate of claim 1, wherein the potassium is comprised in a form of potassium oxide ($K_2O$).

4. The lithium titanate of claim 1, wherein an average particle diameter of the lithium titanate is from about 700 nm to about 1 μm.

5. A negative electrode for a lithium secondary battery, the negative electrode comprising a negative active material comprising a binder, a conductive agent and a Lithium titanate ($Li_4Ti_5O_{12}$) compound comprising 0.004 parts by weight or less of phosphorous (P) and 0.007 parts by weight or less of potassium (K) based on 100 parts by weight of lithium titanate.

6. The negative electrode of claim 5, wherein the phosphorous is comprised in a form of phosphorus pentoxide ($P_2O_5$) or phosphorus trioxide ($P_2O_3$).

7. The negative electrode of claim 5, wherein the potassium is comprised in a form of potassium oxide ($K_2O$).

8. The negative electrode of claim 5, wherein an average particle diameter of the lithium titanate is from about 700 nm to about 1 μm.

9. The negative electrode of claim 5, wherein the conductive agent comprises at least one selected from the group consisting of denka black, ketjen black, artificial graphite, carbon black, acetylene black, and flaky graphite.

10. The negative electrode of claim 5, wherein the binder comprises at least one selected from the group consisting of polyvinylidene fluoride, styrene butadiene rubber, and polyimide.

11. A lithium secondary battery comprising the negative electrode of claim 5, a positive electrode, and an electrolyte.

12. A lithium secondary battery comprising the negative electrode of claim 6, a positive electrode, and an electrolyte.

13. A lithium secondary battery comprising the negative electrode of claim 7, a positive electrode, and an electrolyte.

14. A method of manufacturing a negative electrode for a lithium secondary battery, the method comprising:
    mixing titanium dioxide ($TiO_2$) including phosphorous (P) and potassium (K) with a lithium precursor to provide a first composition:
    sintering the first composition to prepare lithium titanate;
    providing a negative active material composition including lithium titanate; and
    coating the negative active material composition on a substrate, wherein the lithium titanate ($Li_4Ti_5O_{12}$) compound comprises 0.001 to about 0.004 parts by weight of phosphorous (P) and 0.001 to about 0.007 parts by weight of potassium (K) based on 100 parts by weight of lithium titanate.

15. The method of claim 14, wherein the titanium dioxide has whiteness of about 96 to about 99%.

16. The method of claim 14, wherein the titanium dioxide comprises 0.008 parts by weight or less of phosphorous (P) and 0.008 parts by weight or less of potassium (K) based on 100 parts by weight of titanium dioxide.

17. The method of claim 14, wherein the negative active material composition comprises a binder, a conductive agent, and a solvent.

18. The method of claim 14, wherein the lithium precursor comprises at least one selected from the group consisting of $LiCO_3$, $LiCl$, $LiOH$, $LiNO_3$, $LiF$, $LiSO_4$, and $LiNO_3$.

19. The method of claim 14, wherein the sintering temperature is from about 700 to about 1000° C.

* * * * *